United States Patent
Lin

(10) Patent No.: US 8,085,016 B2
(45) Date of Patent: Dec. 27, 2011

(54) POWER SUPPLY CIRCUIT HAVING STANDBY DETECTION CIRCUIT

(75) Inventor: Ching-Chung Lin, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 291 days.

(21) Appl. No.: 12/384,442

(22) Filed: Apr. 3, 2009

(65) Prior Publication Data

US 2009/0251205 A1 Oct. 8, 2009

(30) Foreign Application Priority Data

Apr. 3, 2008 (TW) .............................. 97112289 A

(51) Int. Cl.
*G05F 1/00* (2006.01)
(52) U.S. Cl. ....................................................... 323/272
(58) Field of Classification Search .................. 323/271, 323/272; 307/43; 713/320, 323, 324
See application file for complete search history.

(56) References Cited

U.S. PATENT DOCUMENTS

| 4,608,625 | A | 8/1986 | Josephson et al. |
| 2007/0135866 | A1* | 6/2007 | Baker et al. ............... 340/539.12 |
| 2009/0085655 | A1* | 4/2009 | Lin ............................... 327/544 |

FOREIGN PATENT DOCUMENTS

CN 2452222 Y 10/2001

\* cited by examiner

*Primary Examiner* — Jue Zhang
(74) *Attorney, Agent, or Firm* — Altis Law Group, Inc.

(57) ABSTRACT

A power supply circuit includes a voltage output controller configured for outputting voltages, a standby controller configured for directing the voltage output controller to provide voltage to a load, and a microprocessor configured for controlling the standby controller according to a mode of the load. The voltage output controller is applied with a direct current voltage. When the load enters active mode from a powered off mode, the standby controller sends a control signal to the voltage output controller to output direct current voltage to the load and the microprocessor. When the load enters standby mode from the active mode, the microprocessor directs the standby controller to prevent the voltage output controller from outputting direct current voltage to the load and the microprocessor.

19 Claims, 4 Drawing Sheets

POWER SUPPLY CIRCUIT HAVING STANDBY DETECTION CIRCUIT

BACKGROUND

1. Technical Field

The present disclosure relates to power supply, and particularly to a power supply circuit having a standby detection circuit.

2. Description of Related Art

Information handling systems, such as computer systems, often enter a standby mode when specific pre-defined events, such as certain signals, occur or are absent. During the standby mode, high power components are usually shut off. However, these systems still require a significant amount of power during the standby mode. Additionally, government requirements and industry demands are setting even lower power consumption limits for standby mode to further conserve energy. Existing devices, even if equipped with low power modes, do not comply with these new standards, since minimal control circuits are necessary to detect mode changes. For example, a microprocessor of a power supply circuit may continue to operate to generate a control signal keeping a power supply circuit in standby mode, or generate another control signal to activate the power supply circuit. Accordingly, the power consumption of the power supply circuit can be further reduced.

What is needed, therefore, is a power supply circuit that can overcome the described limitations.

DETAILED DESCRIPTION

Reference will now be made to the drawings to describe the present disclosure in detail.

Figure 1:
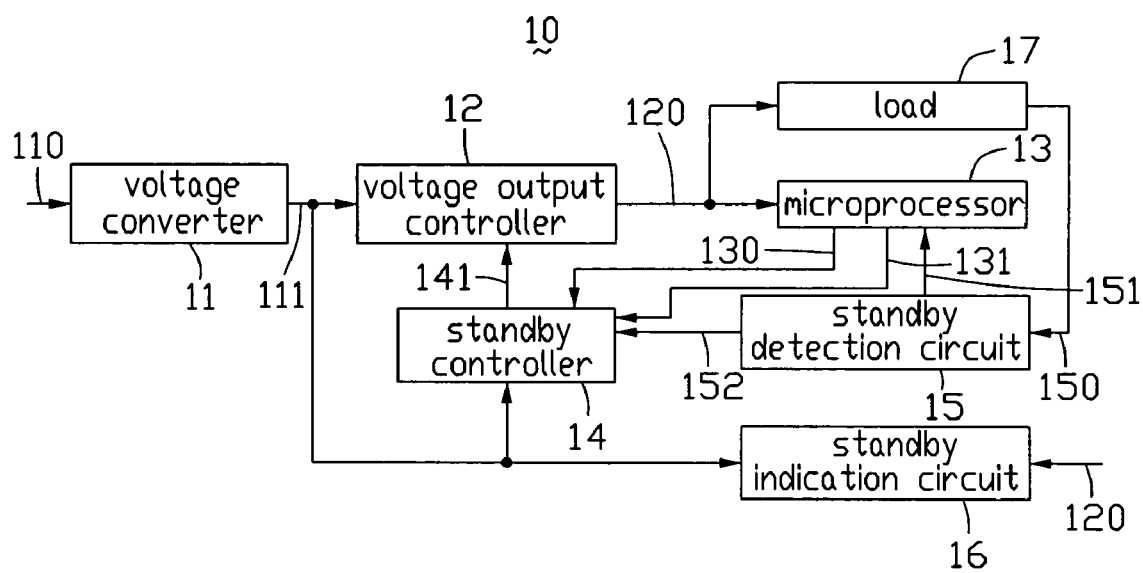
FIG. 1 is a block diagram of a power supply circuit according to a first embodiment of the present disclosure, the power supply circuit including a voltage converter, a voltage output controller, a standby indication circuit, and a standby controller.

FIG. 1 is a block diagram of a power supply circuit according to a first embodiment of the present disclosure. The power supply circuit 10 includes a voltage converter 11, a voltage output controller 12, a microprocessor 13, a standby controller 14, a standby detection circuit 15, and a standby indication circuit 16. The power supply circuit 10 supplies power to a load 17. When the power supply circuit 10 is applied to a liquid crystal display (LCD), the load 17 can be an LCD panel, an inverter, or a universal serial bus (USB), or other power-consuming device.

The voltage converter 11 receives alternating current (AC) voltage from an input terminal 110, and outputs a direct current (DC) voltage from an output terminal 111. The DC voltage is equal to 5V, in one exemplary embodiment.

An input terminal 150 of the standby detection circuit 15 detects a voltage of the load 17 to determine whether the load 17 is in an active mode or standby mode. A first output terminal 151 or a second output terminal 152 of the standby detection circuit 15 sends a first control signal to the microprocessor 13 and the standby controller 14, according to the mode of the load 17. A first output terminal 131 or a second output terminal 132 of the microprocessor 13 sends a corresponding second control signal to the standby controller 14, according to the received first control signal from the standby detection circuit 15.

The standby controller 14 receives the DC voltage from the voltage converter 11, and sends a third control signal to the voltage output controller 12, according to the first control signal from the microprocessor 13 and the second control signal from the standby detection circuit 15.

The voltage output controller 12 receives DC voltage from the voltage converter 11 and the third control signal from the standby controller 14. The third control signal controls the voltage output controller 12 whether to provide power to the microprocessor 13, the standby indication circuit 16, and the load 17.

The standby indication circuit 16 receives the DC voltage from the voltage converter 11, and the output voltage from the output voltage controller 12. The standby indication circuit 16 indicates the standby mode of the power supply circuit 10.

Figure 2:
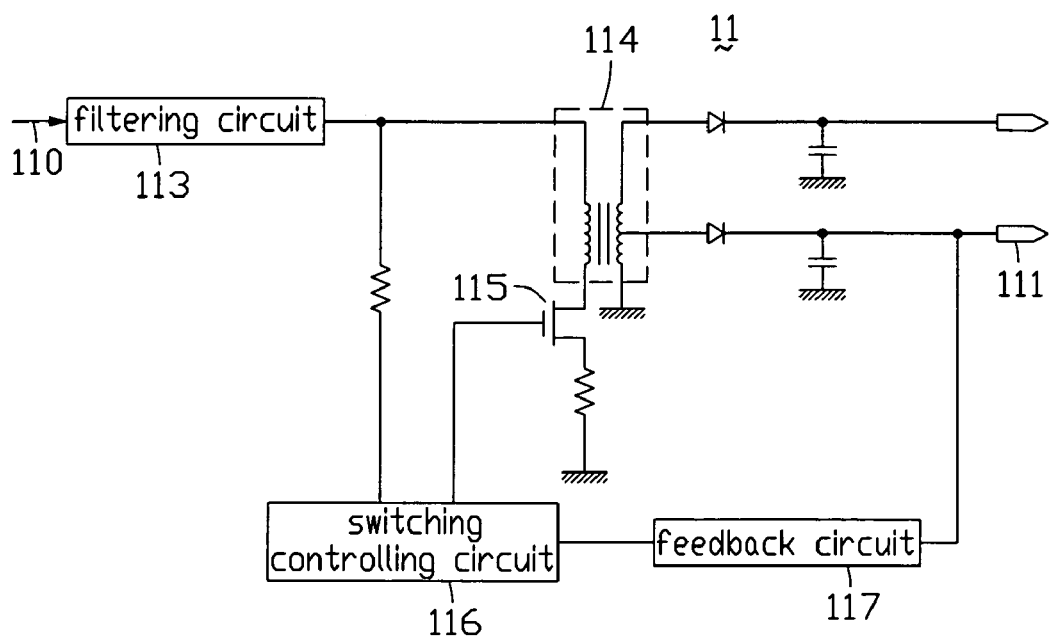
FIG. 2 is a circuit diagram of the voltage converter of FIG. 1.

Referring to FIG. 2, the voltage converter 11 includes a filtering circuit 113, a transformer 114, a first transistor 115, a switching controlling circuit 116, and a feedback circuit 117. The first transistor 115 is a MOSFET (metal oxide semiconductor field effect transistor).

The output terminal 110 of the voltage converter 11 is electrically connected to a first terminal of a primary winding of the transformer 114 via the filtering circuit 113. A second terminal of the primary winding of the transformer 114 is electrically connected to a drain electrode of the transistor 115. A source electrode of the transistor 115 is connected to ground via a resistor (not labeled). A third terminal of a secondary winding of the transformer 114 is connected to ground. A sliding terminal of the secondary winding of the transformer 114 is connected to the output terminal 111.

The switching controlling circuit 116 is connected to a gate electrode of the first transistor 115. The output terminal is connected to the switching controlling circuit 116 via the feedback circuit 117. The switching controlling circuit 116 controls a turn-on period of the first transistor 115 according to a feedback voltage from the feedback circuit 117, thereby adjusting the output voltage of the output terminal 111.

Figure 3:
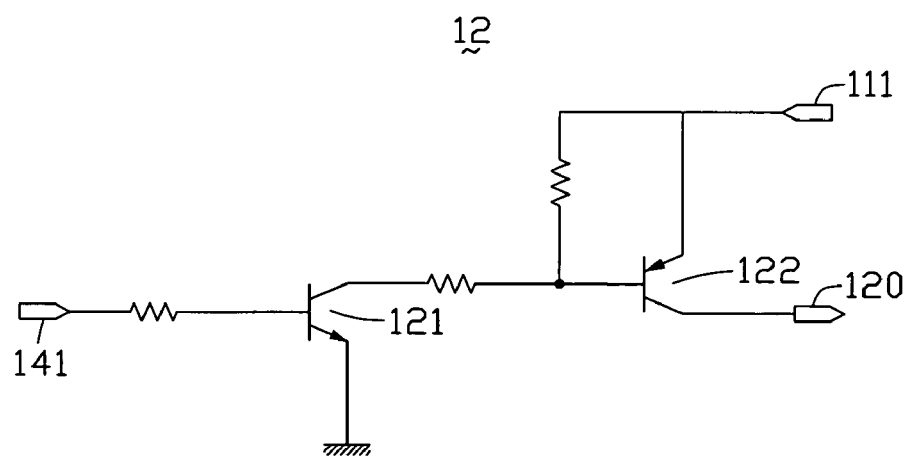
FIG. 3 is a circuit diagram of the voltage output controller of FIG. 1.

Referring to FIG. 3, the output voltage controller 12 includes a second transistor 121, and a third transistor 122. The second transistor 121 is an NPN bipolar transistor, and the third transistor 122 is a PNP bipolar transistor. A base electrode of the second transistor 121 is connected to the output terminal 141 of the standby controller 14. An emitter electrode of the second transistor 121 is connected to ground. A collector electrode of the second transistor 121 is connected to a base electrode of the third transistor 122 via a resistor (not labeled). A collector electrode of the third transistor 122 is connected to the output terminal 120 of the voltage output controller 12. An emitter electrode of the third transistor 122 is connected to the output terminal 111 of the voltage converter 11. The emitter electrode of the third transistor 122 is connected to the base electrode of the third transistor 122 via a resistor (not labeled).

Figure 4:
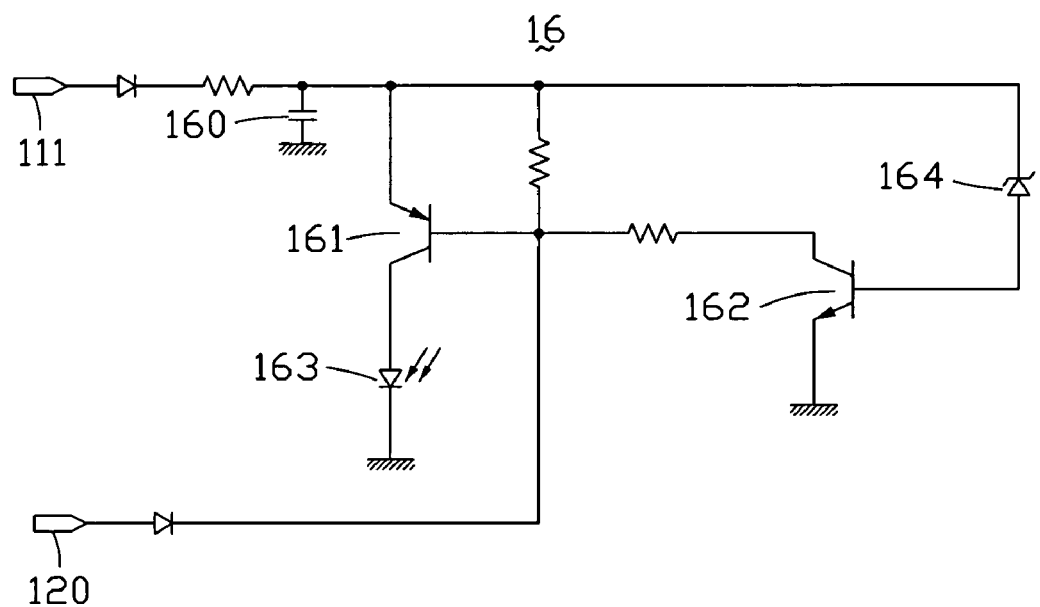
FIG. 4 is a circuit diagram of the standby indication circuit of FIG. 1.

Referring to FIG. 4, the standby indication circuit 16 includes a capacitor 160, a fourth transistor 161, a fifth transistor 162, a light emitting diode (LED) 163, and a manostat 164. The manostat 164 may be a zener diode, in one example. The fourth transistor 161 is a PNP bipolar transistor, and the fifth transistor 162 is an NPN bipolar transistor. [[ Please check if you used the right word. I am pretty sure that this is an incorrect term so I am not sure what you are trying to say. If I were you, I would replace "manostat 164" with "diode 164."

An emitter electrode of the fourth transistor 161 is connected to the output terminal 111 of the voltage converter 11 via a resistor (not labeled) and a diode (not labeled), and is connected to ground via the capacitor 160. A collector electrode of the fourth transistor 161 is connected to ground via the LED 163. A base electrode of the fourth transistor 161 is connected to the emitter electrode thereof via a resistor (not labeled), a collector electrode of the fifth transistor 162 via another resistor (not labeled), the output terminal 120 of the voltage output controller 12 via another diode (not labeled), respectively. An emitter electrode of the fifth transistor 162 is connected to ground. A base electrode of the fifth transistor 162 is connected to the emitter electrode of the fourth transistor 161 via the manostat 164.

Figure 5:
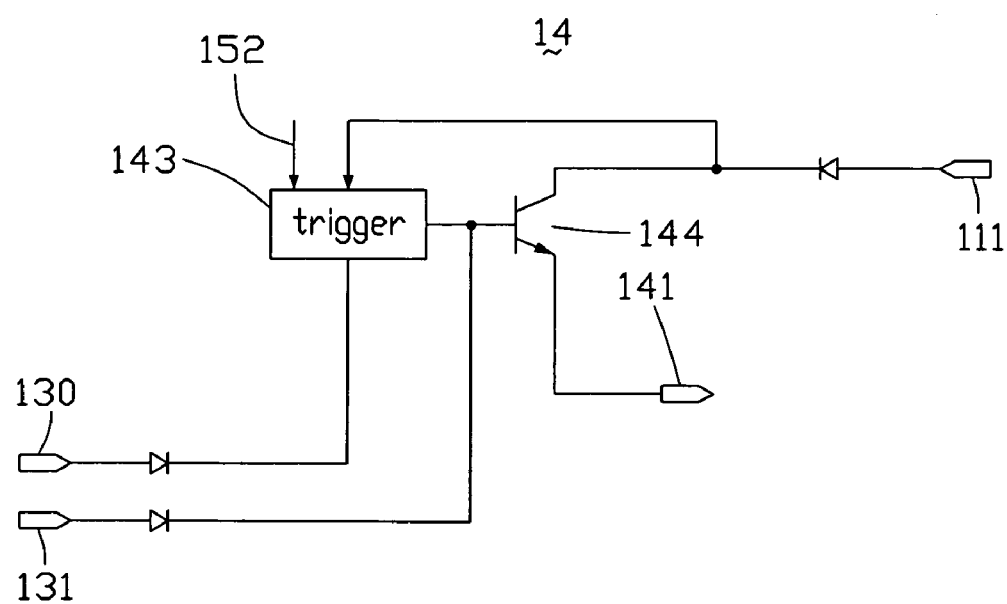
FIG. 5 is a circuit diagram of the standby controller of FIG. 1.

Referring to FIG. 5, the standby controller 14 includes a trigger 143 and a sixth transistor 144. The sixth transistor 144 is an NPN bipolar transistor. The first output terminal 130 of the microprocessor 13 is connected to a first input terminal (not labeled) of the trigger 143 via a diode (not labeled). The second output terminal 131 of the microprocessor 13 is connected to a base electrode of the sixth transistor 144 via a diode (not labeled). The second output terminal 152 of the standby detection circuit 15 is connected to a second input terminal (not labeled) of the trigger 143. The output terminal 111 of the voltage converter 11 provides voltage to the trigger 143, and a collector electrode of the sixth transistor 144. An output terminal of the trigger 143 is connected to the base electrode of the sixth transistor 144. An emitter electrode of the sixth transistor 144 is connected to the output terminal 141 of the standby controller 14.

The operation of the power supply circuit 10 is described in the following, in which, for purposes of description, the load 17 originates within a liquid crystal display, although the disclosure is not limited thereto.

When the power supply circuit 10 is powered on, AC current is applied to the input terminal 110 of the voltage converter 11. The voltage converter 11 outputs DC voltage to the emitter electrode of the third transistor 122 of the voltage output controller 12. The standby detection circuit 15 detects voltage signals of the liquid crystal display, such as digital visual interface (DVI) signals, video graphics array (VGA) signals, or high definition multimedia interface (HDMI) signals.

If the standby detection circuit 15 detects a voltage signal of the load 17, the standby detection circuit 15 sends a control signal to the trigger 143 of the standby detection circuit 14. The trigger 143 is activated to provide a voltage signal to turn on the sixth transistor 144 of the standby detection circuit 14. The DC voltage from the output terminal 111 is applied to the base electrode of the second transistor 121 via the sixth transistor 144. The second transistor 121 is turned on. The base electrode of the third transistor 122 is connected to ground, thus having low voltage. The third transistor 122 is turned on. Accordingly, the DC voltage from the output terminal 111 is applied to the load 17, the microprocessor 13, and the standby indication circuit 16, via the third transistor 122 and the output terminal 120 of the voltage output controller 12.

The output voltage of the voltage output terminal 120 is applied to the base electrode of the fourth transistor 161, so that the fourth transistor 161 is turned off. Thus, the LED 163 is turned off, and it stops emitting light. The microprocessor 13 is powered on. The first output terminal 130 and the second output terminal 131 send control signals to the trigger 143 and the base electrode of the sixth transistor 144 to lock them in active mode.

When the power supply circuit 10 is powered off, the first output terminal 151 of the standby detection circuit 15 sends a control signal to the microprocessor 13. The second output terminal 131 of the microprocessor 13 sends a low level voltage to the base electrode of the sixth transistor 144 of the standby controller 14. The sixth transistor 144 is turned off. The output terminal 141 of the standby controller 14 outputs a low level voltage. The second transistor 121 of the voltage output controller 12 is turned off. The base electrode of the third transistor 122 has a high level voltage. The third transistor 122 is turned off. Thus, the voltage output terminal 120 of the voltage output controller 12 stops providing voltage to the load 17, the microprocessor 13, and the standby indication circuit 16. The microprocessor 13 is powered off, and stops providing control signals to the trigger 143 and the sixth transistor 144.

When the load 17 is powered off, the power supply circuit 10 enters standby mode. The output terminal 111 of the voltage converter 11 charges the capacitor 160 of the standby indication circuit 16. When a voltage of the capacitor 160 reaches a predetermined value, the manostat 164 is turned on. The fifth transistor 162 is then turned on. The base electrode of the fourth transistor 161 has a low level voltage equal to ground voltage, so that the fourth transistor 161 is turned on. The capacitor 160 discharges via the fourth transistor 161 and the LED 163. The LED 163 begins to emit light.

When the capacitor 160 discharges to a predetermined value, the fourth transistor 161 and the fifth transistor 162 are turned off. The LED 163 stops emitting light. The output terminal 111 of the voltage converter 11 begins to charge the capacitor 160 again. When the capacitor 160 is charged to the predetermined value, the LED 163 begins emitting light again. Thus, the LED 163 flickers to indicate that the power supply circuit is in standby mode.

As described, when the power supply circuit 10 returns to standby mode, the voltage output controller 12 provides no voltage to the microprocessor 13, the load 17, and the standby indication circuit 16. Therefore, power consumption of the power supply circuit 10 is lower at the standby mode.

Figure 6:
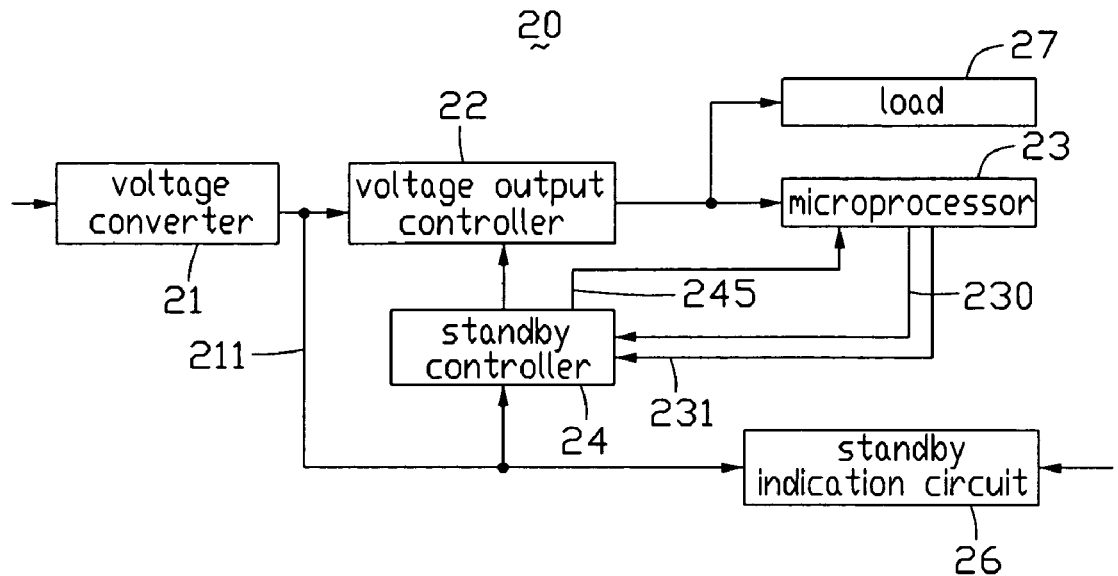
FIG. 6 is a block diagram of a power supply circuit according to a second embodiment of the present disclosure, the power supply circuit including a standby controller.

FIG. 6 is a block diagram of a power supply circuit according to a second embodiment of the present disclosure. The power supply circuit 20 includes a voltage converter 21, a voltage output controller 22, a microprocessor 23, a standby controller 24, and a standby indication circuit 26. The voltage converter 21, the voltage output controller 22, and the standby indication circuit 26 are the same as the voltage converter 11, the voltage output controller 12, and the standby indication circuit 16 respectively. The power supply circuit 20 supplies power to a load 27.

Figure 7:
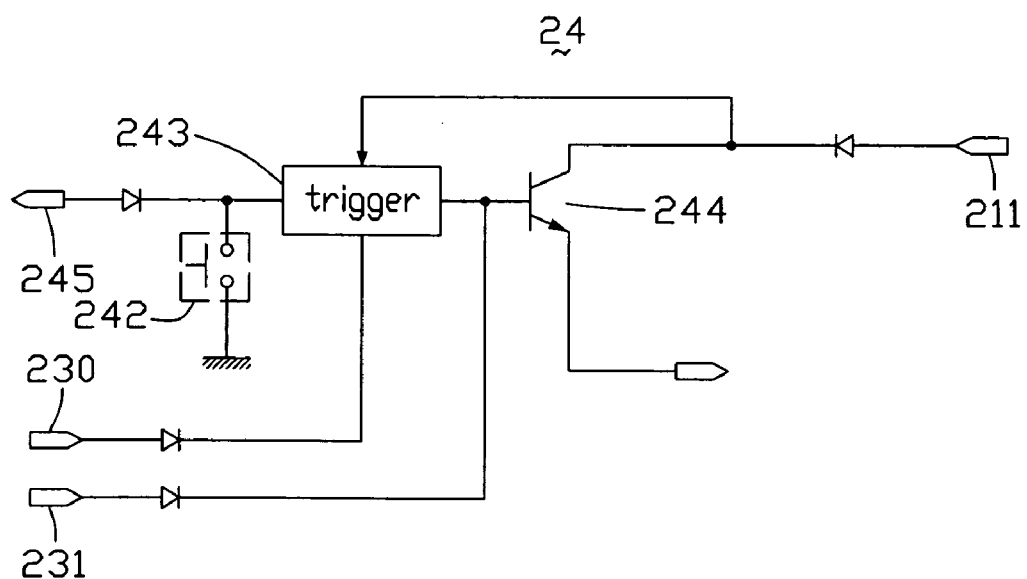
FIG. 7 is a circuit diagram of the standby controller of FIG. 6.

Referring to FIG. 7, the standby controller 24 differs from that of the first embodiment in the further inclusion of a manual switch 242. The power supply circuit 20 can be forced into standby mode by operation of the switch 242. The switch 242 may be a bidirectional switch, a touch switch, or a unidirectional switch. A first terminal of the switch 242 is connected to ground. A second terminal of the switch 20 is connected to a trigger 243 of the standby controller 24, and is connected to the microprocessor 23 via a second output terminal of the standby controller 24.

The power supply circuit 20 is operated as follows. When the power supply circuit 20 is powered on, an AC voltage is applied to the input terminal 210 of the voltage converter 21. An output terminal 211 of the voltage converter 21 provides DC voltage to the voltage output controller 22, the standby controller 24, and the standby indication circuit 26. Activation of switch 242 generates a pulse signal, which directs the trigger 243 to generate a voltage signal applied to a base electrode of a sixth transistor 244. The sixth transistor 244 is turned on. The output terminal 211 of the voltage converter 21 provides voltage to the voltage output controller 22 via the sixth transistor 244. The voltage output controller 22 provides voltage to the microprocessor 23, the load 27, and the standby indication circuit 26. When the microprocessor 23 receives the voltage, a first output terminal 230 and a second output terminal 231 of the microprocessor 23 send control signals to the trigger 243 and the base electrode of the sixth transistor 244, respectively, to lock them in active mode.

Activation of the switch 242 again when the power supply circuit 20 is in active mode, generates another pulse signal, provided to the microprocessor 23 via the second output terminal 245 of the standby controller 24. The second output terminal 231 of the microprocessor 23 outputs low voltage to the base electrode of the sixth transistor 244. The sixth transistor 244 is turned off. The standby controller 24 directs the voltage output controller 22 to stop voltage to the microprocessor 23, the load 27, and the standby indication circuit 26. The power supply circuit 20 remains in standby mode.

As described, when the power supply circuit 20 enters standby mode, the voltage output controller 22 provides no voltage to the microprocessor 23, the load 27, and the standby indication circuit 26. Therefore, power consumption of the power supply circuit 20 is lower at the standby mode.

In further and/or alternative embodiments, all the bipolar transistors in the first and the second embodiments can be replaced by field effect transistors or other switching elements. Furthermore, a power supply circuit can include both the standby detection circuit 15 and the switch 242, so that the power supply circuit can return to standby mode automatically by detecting a load, or manually by activation of the switch.

It is to be understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A power supply circuit, comprising:
a voltage output controller comprising a first switching element and a second switching element;
a standby controller, comprising a trigger and a third switching element, the trigger comprising an input terminal and an output terminal;
a standby detection circuit configured for detecting a mode of a load, the standby detection circuit comprising an input terminal and two output terminals; and
a microprocessor comprising a first input terminal, a second input terminal, and an output terminal;
wherein each of the first, second, and third switching elements comprises an input terminal, an output terminal, and a control terminal, each input terminal of the second and the third switching elements being applied with a direct current voltage, the input terminal of the first switching element being connected to ground, the output terminal of the first switching element being connected to the control terminal of the second switching element, the control terminal of the first switching element being connected to the output terminal of the third switching element, the output terminal of the second switching element being connected to the load, and the first input terminal of the microprocessor, the input terminal of the standby detection circuit being connected to the load, the two output terminals of the standby detection circuit being connected to an input terminal of the microprocessor and the input terminal of the trigger, the output terminal of the trigger being connected to the control terminal of the third switching element and the input terminal of the microprocessor, wherein when the input terminal of the standby detection circuit detects the load entering an active mode from a power off mode, the standby detection circuit sends a control signal to the trigger, the trigger generating a voltage to turn on the third switching element, the direct current voltage being applied to the first switching element via the third switching element, the first and the second switching elements being turned on sequentially, the direct current voltage being applied to the load and the microprocessor via the second switching element, wherein when the standby detection circuit detects the load entering a standby mode from the active mode, the standby detection circuit sends another control signal to the microprocessor, the microprocessor controlling the third switching element, and the first and the second switching elements to be turned off sequentially such that power is restricted from reaching the load and the microprocessor, the power supply circuit being in the standby mode.

2. The power supply circuit of claim 1, wherein the third switching element comprises a transistor, a base electrode of the transistor being connected to the output terminal of the trigger, a collector electrode of the transistor being applied with the direct current voltage, and an emitter electrode of the transistor being connected to the control terminal of the first switching element.

3. The power supply circuit of claim 2, wherein the transistor is an NPN transistor.

4. The power supply circuit of claim 1, wherein the first switching element comprises a transistor, the base electrode thereof being connected to the output terminal of the third switching element, an emitter electrode thereof the transistor being connected to ground, and a collector electrode thereof being connected to the control terminal of the second switching element.

5. The power supply circuit of claim 4, wherein the transistor is an NPN transistor.

6. The power supply circuit of claim 1, wherein the second switching element comprises a transistor, a base electrode thereof being connected to the output terminal of the first switching element and an emitter electrode thereof, the collector electrode thereof being connected to the load and the input terminal of the microprocessor, and the emitter electrode thereof being applied with the direct current voltage.

7. The power supply circuit of claim 1, further comprising a voltage converter, the voltage converter for receiving an alternating voltage from an external circuit, and outputting direct current voltage to the input terminals of the second and the third switching elements.

8. The power supply circuit of claim 7, wherein the voltage converter comprises a switching controlling circuit, a transistor, and a transformer, the switching controlling circuit for controlling a turn on period of the transistor, so as to adjust the output voltage of the transformer.

9. The power supply circuit of claim 1, further comprising a standby indication circuit configured for indicating a standby mode of the power supply circuit.

10. A power supply circuit, comprising:
a voltage output controller, comprising a first switching element and a second switching element;
a standby controller, comprising a trigger, a third switching element, and a manual switch, the trigger comprising an input terminal and an output terminal; and
a microprocessor comprising an input terminal, and an output terminal;
wherein each of the first, the second, and the third switching elements comprises an input terminal, an output terminal, and a control terminal, each input terminal of the second and the third switching elements being applied with a direct current voltage, the input terminal of the first switching element being connected to ground, the output terminal of the first switching element being connected to the control terminal of the second switching element, the control terminal of the first switching element being connected to the output terminal of the third switching element, the output terminal of the second switching element being connected to the load and the first input terminal of the microprocessor, the input terminal of the trigger being connected to the manual switch, the output terminal of the trigger being connected to the control terminal of the third switching element and the output terminal of the microprocessor, wherein activation of the manual switch generates a first control signal then provided to the trigger, the trigger generating a voltage signal to turn on the third switching element, the direct current voltage being applied to the first switching element via the third switching element, the first and the second switching elements being turned on sequentially, the direct current voltage being applied to the load and the microprocessor via the second switching element, the power supply circuit entering an active mode from a powered off mode; and upon a subsequent activation of the manual switch, a second control signal is generated and applied to the microprocessor, the microprocessor turning off the third, the first, and the second switching elements sequentially, the second switching element stopping voltage to the load and the microprocessor, and the power supply circuit entering a standby mode from the active mode.

11. The power supply circuit of claim 10, wherein the third switching element comprises a transistor, a base electrode which is connected to the output terminal of the trigger, a collector electrode of which is applied with the direct current voltage, and an emitter electrode of which is connected to the control terminal of the first switching element.

12. The power supply circuit of claim 11, wherein the transistor is an NPN transistor.

13. The power supply circuit of claim 10, further comprising a voltage converter, the voltage converter receiving an alternating voltage from an external circuit, and outputting direct current voltage to the input terminals of the second and the third switching elements.

14. The power supply circuit of claim 10, further comprising a standby indication circuit configured for indicating a standby mode of the power supply circuit.

15. A power supply circuit, comprising:
a voltage output controller for outputting voltages, the voltage output controller comprising a first switching element and a second switching element;
a standby controller for controlling the voltage output controller whether to provide the voltages to a load, the standby controller comprising a third switching element; and
a microprocessor;
wherein each of the first, second, and third switching elements comprises an input terminal, an output terminal, and a control terminal, each input terminal of the second and the third switching elements are applied with a direct current voltage, the input terminal of the first switching element is connected to ground, the output terminal of the first switching element is connected to the control terminal of the second switching element, the control terminal of the first switching element is connected to the output terminal of the third switching element, the output terminal of the second switching element is connected to the load and the microprocessor, the microprocessor is capable of generating a control signal to the standby controller when the load enters a standby mode from an active mode, and the standby controller receives the control signal to control the third switching element, the first switching element and the second switching element to be turned off sequentially such that the voltages are restricted from reaching the load and the microprocessor, and the power supply circuit enters the standby mode.

16. The power supply circuit of claim 15, wherein the standby controller circuit further comprising a trigger, the trigger is capable of generating a voltage to control the third switching element to be switched on when the load enters the active mode from a power off mode, and when the third switching element is switched on, the direct current voltage is applied to the first switching element via the third switching element, such that the first and the second switching elements are turned on sequentially, and then the direct current voltage is applied to the load and the microprocessor via the second switching element.

17. The power supply circuit of claim 16, further comprising a standby indication circuit for indicating that the power supply circuit enters the standby mode.

18. The power supply circuit of claim 16, further comprising a standby detection circuit comprising an inputting terminal for detecting a voltage of the load to determining the load is in the active mode or the standby mode, a first outputting terminal connecting to the microprocessor and a second outputting terminal connecting to the trigger, wherein when the standby detection circuit detects the load is in the active mode, the standby detection sends a signal to the trigger via the second outputting terminal so that the trigger outputs the voltage to switch on the third switching element; and when the standby detection circuit detects the load is in the standby mode, the standby detection circuit sends a signal to the microprocessor via the first outputting terminal so that the microprocessor outputs the control signal to switch off the third switching element.

19. The power supply circuit of claim 16, further comprising a manual switch for generating pulse signals to the trigger and the microprocessor according to the mode of the load, wherein when the power supply circuit is powered on, the manual switch generates a pulse signal to the trigger to control that the trigger outputs the voltage to switch on the third switching element; and when the manual switch generates a pulse signal again, the manual switch sends the pulse signal to the microprocessor so that the microprocessor outputs the control signal to switch off the third switching element.

* * * * *